(12) United States Patent
Grechanik

(10) Patent No.: US 8,423,986 B1
(45) Date of Patent: Apr. 16, 2013

(54) RANDOM UTILITY GENERATION TECHNOLOGY

(75) Inventor: Mark Grechanik, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 1 day.

(21) Appl. No.: 13/271,686

(22) Filed: Oct. 12, 2011

(51) Int. Cl.
*G06F 9/45* (2006.01)
*G06F 17/18* (2006.01)
*G06Q 40/00* (2012.01)

(52) U.S. Cl.
USPC .............................. 717/154; 702/179; 705/36

(58) Field of Classification Search .................. None
See application file for complete search history.

(56) References Cited

U.S. PATENT DOCUMENTS

| | | | | |
|---|---|---|---|---|
| 7,593,833 | B2 * | 9/2009 | Savoor et al. | 702/186 |
| 7,698,196 | B1 * | 4/2010 | Rouvinez et al. | 705/36 R |
| 7,979,852 | B2 * | 7/2011 | Bodin et al. | 717/154 |
| 8,229,726 | B1 * | 7/2012 | Magdon-Ismail et al. | 703/20 |
| 2004/0015329 | A1 * | 1/2004 | Shayegan et al. | 702/179 |
| 2004/0039619 | A1 * | 2/2004 | Zarb | 705/7 |
| 2005/0246158 | A1 * | 11/2005 | Weise | 704/4 |
| 2007/0208645 | A1 * | 9/2007 | Hoffman et al. | 705/36 R |

OTHER PUBLICATIONS

Shadi Abdul Khalek and Sarfraz Khurshid. Automated sql query generation for systematic testing of database engines. In Proceedings of the IEEE/ACM international conference on Automated software engineering, ASE '10, pp. 329-332, New York, NY, USA, Sep. 2010. ACM.

Alfred V. Aho, Ravi Sethi, and Jeffrey D. Ullman. Compilers: principles, techniques, and tools. Addison-Wesley Longman Publishing Co., Inc., Boston, MA, USA, 1986 (reprinted Mar. 1988).

Stephen M. Blackburn, Robin Garner, Chris Hoffmann, Asjad M. Khang, Kathryn S. McKinley, Rotem Bentzur, Amer Diwan, Daniel Feinberg, Daniel Frampton, Samuel Z. Guyer, Martin Hirzel, Antony Hosking, Maria Jump, Han Lee, J. Eliot B. Moss, B. Moss, Aashish Phansalkar, Darko Stefanovic, Thomas VanDrunen, Daniel von Dincklage, and Ben Wiedermann. The dacapo benchmarks: java benchmarking development and analysis. In Proceedings of the 21st annual ACM SIGPLAN conference on Object-oriented programming systems, languages, and applications, OOPSLA.

Stephen M. Blackburn, Kathryn S. McKinley, Robin Garner, Chris Hoffmann, Asjad M. Khan, Rotem Bentzur, Amer Diwan, Daniel Feinberg, Daniel Frampton, Samuel Z. Guyer, Martin Hirzel, Antony Hosking, Maria Jump, Han Lee, J. Eliot B. Moss, Aashish Phansalkar, Darko Stefanovik, Thomas VanDrunen, Daniel von Dincklage, and Ben Wiedermann. Wake up and smell the coffee: evaluation methodology for the 21st century. Commun. ACM, 51:83-89, Aug. 2008.

Sara Cohen and Benny Kimelfeld. Querying parse trees of stochastic context-free grammars. In Proceedings of the 13th International Conference on Database Theory, ICDT '10, pp. 62-75, New York, NY, USA, Mar. 2010. ACM.

(Continued)

*Primary Examiner* — Don Wong
*Assistant Examiner* — Mohammad Kabir
(74) *Attorney, Agent, or Firm* — Fish & Richardson P.C.

(57) ABSTRACT

Random utility generation technology, in which configuration data that is descriptive of benchmark program complexity and scale is accessed and configuration parameters used in generating random benchmark programs are set based on the accessed configuration data. Predefined code elements that are used in generating random benchmark programs are accessed and a random benchmark program that has the benchmark program complexity and scale is constructed based on the accessed code elements and the set configuration parameters.

19 Claims, 11 Drawing Sheets

OTHER PUBLICATIONS

DoD. DoD Supercomputing Resource Center: Role of Application Benchmarks in the DoD HPC Acquisition Process. http://www.erdc.hpc.mil/customerService/CS_E/Benchmarking—Role_of_application_benchmarks_in_the_DoD_HPC_acquisition_process, Mar. 2009.

Bruno Dufour, Karel Driesen, Laurie Hendren, and Clark Verbrugge. Dynamic metrics for java. In Proceedings of the 18th annual ACM SIGPLAN conference on Object-oriented programing, systems, languages, and applications, OOPSLA '03, pp. 149-168, New York, NY, USA, Oct. 2003. ACM.

Sergey Fomel and Jon F. Claerbout. Guest editors' introduction: Reproducible research. Computing in Science and Engineering, 11:5-7, Jan. 2009.

Karama Kanoun and Lisa Spainhower. Dependability Benchmarking for Computer Systems. Wiley-IEEE Computer Society Pr, Jul. 2008.

Rupak Majumdar and Ru-Gang Xu. Directed test generation using symbolic grammars. In Proceedings of the twenty-second IEEE/ACM international conference on Automated software engineering, ASE '07, pp. 134-143, New York, NY, USA, Nov. 2007. ACM.

Brian Marick. How to misuse code coverage. In In Proceedings of the 16th International Conference on Testing Computer Software, pp. 16-18, Jun. 1999.

George McDaniel. IBM dictionary of computing. McGraw-Hill, Inc., New York, NY, USA, Aug. 1993.

Chaitanya Mishra, Nick Koudas, and Calisto Zuzarte. Generating targeted queries for database testing. In Proceedings of the 2008 ACM SIGMOD international conference on Management of data, SIGMOD '08, pp. 499-510, New York, NY, USA, Jun. 2008. ACM.

Kim S. Nash. Information Technology Budgets: Which Industry Spends the Most? CIO.com, Nov. 2007.

Paul Piwowarski, Mitsuru Ohba, and Joe Caruso. Coverage measurement experience during function test. In ICSE '93: Proceedings of the 15th international conference on Software Engineering, pp. 287-301, Los Alamitos, CA, USA, May 1993. IEEE Computer Society Press.

Merkel Poess and John M. Stephens, Jr. Generating thousand benchmark queries in seconds. In Proceedings of the Thirtieth international conference on Very large data bases—vol. 30, VLDB '04, pp. 1045-1053. VLDB Endowment, Aug. 2004.

Rafael H. Saavedra and Alan J. Smith. Analysis of benchmark characteristics and benchmark performance prediction. ACM Trans. Comput. Syst., 14:344-384, Nov. 1996.

Matthias Schwab, Martin Karrenbach, and Jon Claerbout. Making scientific computations reproducible. Computing in Science and Engg., 2:61-67, Nov. 2000.

Donald R. Slutz. Massive stochastic testing of sql. In Proceedings of the 24rd International Conference on Very Large Data Bases, VLDB '98, pp. 618-622, San Francisco, CA, USA, Aug. 1998. Morgan Kaufmann Publishers Inc.

* cited by examiner

400

```
<Configuration>
        <noOfInterfaces>3</noOfInterfaces>
        <useQueries>true</useQueries>
        <maxNoOfMethodsPerInterface>4</maxNoOfMethodsPerInterface>
        <noOfClasses>5</noOfClasses>
        <maxAllowedMethodCalls>8</maxAllowedMethodCalls>
        <injectFilename>InjectFile</injectFilename>
        <password>mysql@1234</password>
        <maximumArraySize>30</maximumArraySize>
        <dbName>test</dbName>
        <noOfInheritanceChains>1</noOfInheritanceChains>
        <probability>18</probability>
        <maxNestedIfs>5</maxNestedIfs>
        <maxInheritanceDepth>4</maxInheritanceDepth>
        <maxNoOfParametersPerMethod>9</maxNoOfParametersPerMethod>
        <dbDriver>com.mysql.jdbc.Driver</dbDriver>
        <totalLOC>10000</totalLOC>
        <maxRecursionDepth>300</maxRecursionDepth>
        <dbUsername>user1234</dbUsername>
        <classNamePrefix>CarFast</classNamePrefix>
        <maxNoOfClassFields>10</maxNoOfClassFields>
        <maxNoOfMethodsPerClass>10</maxNoOfMethodsPerClass>
        <recursionProbability>23</recursionProbability>
        <intMaxValue>3454</intMaxValue>
        <queryFilename>QueryFile</queryFilename>
        <callType>MCO2_1</callType>
        <allowedTypes>
                <type>int</type>
                <type>long</type>
                <type>String</type>
                <type>Object</type>
        </allowedTypes>
</Configuration>
```

```
// begin injected contents
/*
* Example Inject File
* 1. do not specify field names like f0,f1, etc. They are reserved
* for Random Utility Generator generation.
*
* 2. do not specify method names like [ClassPrefix]method[number]. They
* are reserved for RUGRAT generation. Similarly don't mention possible
* interface methods.
*
* 3. write syntactically correct JAVA contents here. You can assume that
* the class block will be written for you, and the contents here will
* be injected into every generated class.
*
* 4. keep the types consistent with config.xml . the contents here will be
* blindly injected into the classes. No verification done before injection.
*
* 5. void is not a valid type.
*
* 6. methods should take at least one argument.
*
*/

//begin injected contents int myClassFieldInteger;

private int myTestFunction(int value)
{
  return 2;
}

//end of injected contents
```

FIG. 5

|  | T0.TInterface4Method0 | T0.T0Method0 | T0.T0Method1 | T1.TInterface3Method0 | T1.TInterface0Method0 | T1.T1Method9 |
|---|---|---|---|---|---|---|
| T0.TInterface4Method0 | 0 | 0 | 1 | 0 | 0 | 0 |
| T0.T0Method0 | 0 | 0 | 0 | 1 | 0 | 0 |
| T0.T0Method1 | 0 | 0 | 0 | 0 | 1 | 0 |
| T1.TInterface3Method0 | 0 | 1 | 0 | 0 | 0 | 1 |
| T1.TInterface0Method0 | 1 | 0 | 0 | 0 | 0 | 0 |
| T1.T1Method9 | 0 | 0 | 0 | 0 | 0 | 0 |

RANDOM UTILITY GENERATION TECHNOLOGY

FIELD

This disclosure relates to random utility generation technology, including a random utility generator for program analysis and testing.

BACKGROUND

Benchmarks are heavily used in different areas of computer science to evaluate processes and tools. Different specialized benchmarks enable researchers and practitioners to evaluate different components of systems while reducing the influence of unrelated components. In program analysis and testing, open-source and commercial programs are used as benchmarks to evaluate different aspects including scalability, test coverage, code translation, optimization, loading, and refactoring, among many others. Unfortunately, these programs are written by programmers who introduce different biases, and it is very difficult to find programs that can serve as benchmarks with high reproducibility of results on other programs.

SUMMARY

In one aspect, a random utility generation system includes at least one processor; and at least one memory coupled to the at least one processor having stored thereon instructions which, when executed by the at least one processor, causes the at least one processor to perform operations. The operations include accessing configuration data that is descriptive of benchmark program complexity and scale and setting configuration parameters used in generating random benchmark programs based on the accessed configuration data. The operations also include accessing predefined code elements that are used in generating random benchmark programs, constructing a random benchmark program that has the benchmark program complexity and scale based on the accessed code elements and the set configuration parameters, and outputting the random benchmark program.

Implementations may include one or more of the following features. For example, the operations may include using a random graph model to generate a random benchmark program with predefined properties. The operations also may include using a stochastic parse tree to generate code for a random benchmark program based on the accessed code elements.

In some implementations, the operations may include generating a reachability matrix for the random benchmark program that shows reachability of code within the random benchmark program. In these implementations, the operations may include generating a reachability matrix for the random benchmark program that shows which methods are reachable from any given method in the random benchmark program.

In addition, the operations may include accessing a configuration file that defines threshold numbers of parts of the random benchmark program to construct and probability that certain types of code elements are included in the random benchmark program. The operations also may include accessing an injection file that includes user-defined code elements that are syntactically correct and injecting the user-defined code elements that are syntactically correct in classes generated for the random benchmark program. The operations further may include constructing conditional statements with variables as opposed to literals, thereby reducing dead code present in the random benchmark program.

In some examples, the operations may include establishing relationships among classes and interfaces in the random benchmark program. In these examples, the operations may include determining methods to implement in the random benchmark program. Further, in these examples, the operations may include generating bodies for the determined methods to implement in the random benchmark program.

The operations may include generating nodes of a stochastic parse tree and assigning probabilities to the generated nodes of the stochastic parse tree. The operations also may include traversing the stochastic parse tree by taking branches of the stochastic parse tree based on the assigned probabilities and adding code to a method body based on nodes taken in traversing the stochastic parse tree.

Further, the operations may include determining whether generation of bodies for the determined methods to implement in the random benchmark program is complete. Based on a determination that generation of bodies for the determined methods to implement in the random benchmark program is not complete, the operations may include continuing to add code to bodies for the determined methods to implement in the random benchmark program by traversing the stochastic parse tree. Based on a determination that generation of bodies for the determined methods to implement in the random benchmark program is complete, the operations may include completing construction of the random benchmark program.

In some implementations, the operations may include generating nodes of a stochastic parse tree that each are associated with a language grammar production rule and assigning probability distribution functions to the generated nodes of the stochastic parse tree that each are associated with a language grammar production rule. In these implementations, the operations may include traversing the stochastic parse tree by taking branches of the stochastic parse tree based on the assigned probability distribution functions and adding code to a method body based on language grammar production rules associated with nodes taken in traversing the stochastic parse tree. Further, in these implementations, the operations may include placing bounds on the probability distribution functions assigned to the generated nodes of the stochastic parse tree that each are associated with a language grammar production rule.

In some examples, the operations may include running the random benchmark program on a test system and storing results of benchmark testing of the test system based on running the random benchmark program on the test system. In these examples, the operations may include determining whether benchmark testing of the test system is complete, based on a determination that benchmark testing of the test system is complete, completing benchmark testing of the test system, and, based on a determination that benchmark testing of the test system is not complete, constructing a new random benchmark program and running the new random benchmark program on the test system. Further, in these examples, the operations may include storing results of benchmark testing of the test system based on running the random benchmark program on the test system and running the new random benchmark program on the test system.

In addition, the operations may include, based on a determination that benchmark testing of the test system is not complete, determining whether modification of the set configuration parameters used to construct the random benchmark program is needed. The operations also may include, based on a determination that modification of the set configuration parameters used to construct the random benchmark program is not needed, constructing a new random benchmark program based on the accessed code elements and the set configuration parameters. The operations further may include, based on a determination that modification of the set configuration parameters used to construct the random benchmark program is needed, modifying the set configuration parameters used to construct the random benchmark program and constructing a new random benchmark program based on the accessed code elements and the modified configuration parameters.

In another aspect, a method includes accessing configuration data that is descriptive of benchmark program complexity and scale and setting configuration parameters used in generating random benchmark programs based on the accessed configuration data. The method also includes accessing, from electronic storage, predefined code elements that are used in generating random benchmark programs, constructing, by at least one processor, a random benchmark program that has the benchmark program complexity and scale based on the accessed code elements and the set configuration parameters, and outputting the random benchmark program.

In yet another aspect, at least one computer-readable storage medium is encoded with executable instructions that, when executed by at least one processor, cause the at least one processor to perform operations. The operations include accessing configuration data that is descriptive of benchmark program complexity and scale and setting configuration parameters used in generating random benchmark programs based on the accessed configuration data. The operations also include accessing predefined code elements that are used in generating random benchmark programs, constructing a random benchmark program that has the benchmark program complexity and scale based on the accessed code elements and the set configuration parameters, and outputting the random benchmark program.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIG. 4 illustrates an exemplary configuration file.
FIG. 5 illustrates an exemplary inject file.
FIG. 9 illustrates an exemplary reachability matrix.

DETAILED DESCRIPTION

Figure 1:
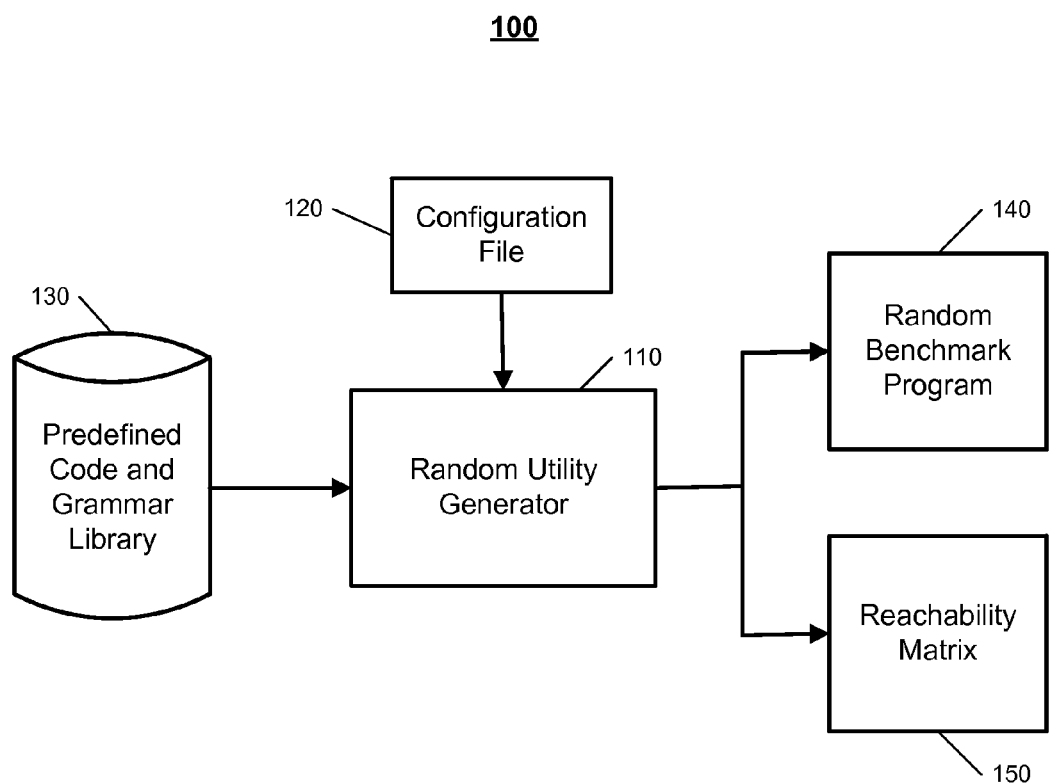
FIGS. 1, 2, and 11 are diagrams of exemplary systems.

A benchmark is a point of reference from which measurements can be made in order to evaluate the performance of hardware or software or both. Importance of benchmarks cannot be overstated, especially considering that organizations and companies use benchmarks to evaluate and choose mission-critical software for business operation. Businesses are often confronted with a limited budget and stringent performance requirements while putting together enterprise applications, and benchmarking is often the only way to choose proper technologies for these applications. Given that corporations spend a significant amount of their revenues on technologies, biased or poorly suitable benchmarks lead to wrong software and hardware architecture decisions that result in large losses every year.

Benchmarks are used for evaluating program analysis and testing processes and tools. Different benchmarks exist to evaluate different program analysis and testing aspects such as scaling for large application, reaching high test coverage, finding bugs, handling different language extensions, translating and refactoring code, executing applications symbolically or concolically, optimizing linking, and loading code in compiler-related technologies, as well as profiling. Currently, a preference is towards selecting benchmarks that have much richer code complexity (e.g., nested if-then statements), class structures, and class hierarchies. Unfortunately, complex benchmark applications are costly to develop, and it is equally difficult to find real-world applications that can serve as unbiased benchmarks for evaluating program analysis and testing approaches.

Consider a situation where different test input data generation approaches are evaluated to determine which approach enables users to achieve higher test coverage faster. On one extreme, using "real-world" applications of low complexity with very few branches are poor candidate benchmarks, since most test input data generation approaches will perform very well. On the other extreme, it may take significant effort to adjust these approaches to work with a distributed application whose components are written in different languages and run on different platforms. Writing benchmark applications from scratch is laborious in terms of manual effort, not to mention that a significant bias and human error can be introduced. In addition, selecting commercial applications as benchmarks negatively affects reproducibility of results, which is a cornerstone of the scientific method. Finally, more than one benchmark is often required to determine the sensitivity of the program analysis and testing approaches based on the variability of results for applications that have different properties.

This disclosure relates to an approach for generating random benchmarks for evaluating program analysis and testing tools. The approach is based on the theories of random graphs and stochastic parse trees, where language grammar production rules are assigned probability distribution functions. These probabilities specify the frequencies with which instantiations of rules will appear in the generated programs. The random programs are similar to real world complex programs using different software metrics, and bounds on the probability distribution functions allow users to generate programs whose statements are reachable in the limit.

A random benchmark application is a randomly selected program from the generally infinite universe of all programs that can be written in a given language. Randomness is associated with the probability with which each program has a chance to be chosen among others from the universe. If certain properties of the program are desired, then the universe should be clustered according to these properties, and clusters with the desired properties should be given higher probabilities. Unfortunately, constructing the universe of all programs for nontrivial languages (e.g., Java and C++) may be difficult. Therefore modeling generation of random benchmark applications as selection from the universe of all programs may be impractical.

A different model of obtaining a random program is by construction. Consider that every program is an instance of the grammar of the language in which this program is written. Grammars may be used in compiler construction to write parsers that check the syntactic validity of a program and transform its source code into a parse tree. An opposite use of the grammar is to generate branches of a parse tree for different production rules, where each rule is assigned the probability with which it is instantiated in a program. Identifiers are randomly generated and used in expression with certain probability distributions. These grammars and parse trees are called stochastic.

A construction process that is based on the stochastic grammar model can be described as follows. Starting with the top production rules of the grammar, each nonterminal is recursively replaced with its corresponding production rule. When more than one production rule can be chosen to replace a nonterminal, a rule is chosen based on the probability that is assigned to it. Thus the higher the probability that is assigned to a rule, the more frequent its instances will appear in the generated program. Terminals are replaced with randomly generated identifiers and values. Termination conditions for generating programs include the limit on the size of the program or the complexity metrics among others. With the stochastic grammar model it is ensured that the generated program is syntactically correct. The construction process can be fine tuned by varying the probabilities and limiting the grammar to a subset of the production rules.

Drawbacks may exist in generating benchmark applications using the construction process that is based on the stochastic grammar model. First, a significant percentage of the application code may be unreachable. Given that all conditional expressions are generated automatically, these expression may always evaluate either to true or false, leading the generated program to contain many unreachable branches or dead code. Of course, many real-world applications contain dead code, which is one of the reasons of why it is often very difficult to get one hundred percent of test coverage. Making it difficult to achieve a high level of test coverage may not be the only problem with benchmark applications. If one hundred percent test coverage is easy to achieve with any randomly chosen test input data, it may be a drawback, as well. For instance, it may be a manifestation of a small application or one of trivial complexity where control flow conditions do not affect the execution of this application. Using such application benchmarks for evaluation of program analysis and testing tools and processes may result in a significant bias and skewed results. Controlling instantiation of production rules with probabilities may result in generating benchmark applications without these reachability drawbacks.

Another potential drawback is that the generated program may not have constructs that make static program analysis undecidable. For example, recursion, dynamic dispatch, and array manipulations by using expressions that compute array indices make it difficult to achieve good precision with program analysis processes. Generators that are based on the stochastic grammar model may not take into consideration these specific language constructs to make the generated programs realistic.

In this disclosure, a random utility generator tool may be implemented (e.g., in Java) and applied to generate benchmarks with which compilers, virtual machines, and testing tools are tested. The random utility generator tool may be language-independent and may generate application benchmarks within specific constraints and within the range of predefined properties. The random utility generator tool may randomly generate application benchmarks using techniques based on random graphs and stochastic parse trees. The random utility generator tool may address drawbacks accompanying the stochastic grammar model based construction of programs.

For example, the conditional expressions whose result can be evaluated at compile-time may lead to dead code. Such conditional expressions are generally constructed out of literals. To reduce such dead code, the random utility generator tool uses variables in scope over literals while constructing conditional expressions.

In addition, the complexity of the generated application may be governed by the probability parameters provided by the user. These parameters govern the various decisions made during the construction process. The size of the application, nesting among expressions and statements, and inheritance hierarchy are examples of program elements that contribute to the complexity of the application. Making these configurable may allow users to generate applications of different scale and complexity based on their needs. This may address the drawback where one hundred percent test coverage is easily achieved with any randomly chosen input data because the generated application was of trivial complexity.

FIG. 1 illustrates an exemplary system 100 for generating random benchmark programs. The system 100 includes a random utility generator 110, a configuration file 120, and a library 130 that stores predefined code elements, such as grammar and grammar rules for a programming language. The random utility generator 110 uses the configuration file 120 and the library 130 to generate a random benchmark program 140 and a reachability matrix 150.

The configuration file 120 defines desired parameters for constructing the random benchmark program 140. The configuration file 120 may be populated based on user input received from a user and stored in electronic storage. The configuration file 120 may define thresholds related to scale and complexity of the random benchmark program 140. For instance, the configuration file 120 may define minimum/maximum number of lines of codes, minimum/maximum number of interfaces, minimum/maximum methods per interface, minimum/maximum number of nested conditional statements, minimum/maximum inheritance depth, probability of recursive functions, etc. The configuration file 120 may include data descriptive of any parameter related to scale and complexity of the random benchmark program 140.

The random utility generator 110 accesses the configuration file 120 and sets configuration parameters used in generating the random benchmark program 140 based on the accessed configuration file. The random utility generator 110 then references the set configuration parameters in generating the random benchmark program 140 to ensure that the random benchmark program 140 is within the limits of the set configuration parameters and, therefore, meets the scale and complexity desired by the user.

The library 130 stores predefined code and grammar of one or more programming languages. The code elements stored in the library 130 include syntactically correct code and grammar rules that enable the random utility generator 110 to construct syntactically correct programs. The library 130 may store code elements and/or rules for any grammar (e.g., any programming language). The random utility generator 110 accesses, from the library 130, predefined code elements and uses the predefined code elements to construct the random benchmark program 140 in accordance with the set configuration parameters.

The random benchmark program 140 is a syntactically correct program in a grammar (e.g., programming language) of the code elements used by the random benchmark program 140 to generate the random benchmark program 140. The random benchmark program 140 may be generated using any grammar (e.g., any programming language) depending on the code and grammar stored in the library 130. The random benchmark program 140 represents a random construction of the code elements from the library 130 within the parameters set based on the configuration file 120. The random utility generator 110 may construct the random benchmark program 140 based on random graphs (e.g., stochastic parse trees) as described throughout this disclosure. The random benchmark program 140 may be used to benchmark test a tool that performs program analysis and testing. Because the random benchmark program 140 has a random construction and is of the scale and complexity desired by the user, the random benchmark program 140 may provide relatively good benchmark test since the random benchmark program 140 is generally not influenced by biases of a programmer (which could skew results of the benchmark test) and has the scale and complexity of real-world programs.

The reachability matrix 150 is a data structure that shows relationships of parts of the random benchmark program 140. For example, the reachability matrix 150 shows which parts of code within the random benchmark program 140 are reachable from which other parts of code within the random benchmark program 140. In this example, the reachability matrix 150 may show which methods are reachable from any given method in the random benchmark program 140.

The reachability matrix 150 may be used in benchmark testing to confirm the complexity of the random benchmark program 140 and/or to evaluate results of a benchmark test. For example, the random benchmark program 140 may be used to test a tool that is designed to detect instances of dead code within a program. In this example, the reachability matrix 150 may be analyzed to determine which methods are not reachable by any other methods in the random benchmark program 140. The output of tool indicating areas of dead code may be compared with the methods determined to be unreachable through analysis of the reachability matrix 150. Results of the comparison may be evaluated to determine whether or not the tool did a good job in identifying areas of dead code in the random benchmark program 140. When benchmark testing a tool designed to detect instances of dead code within a program, the random utility generator 110 may intentionally insert areas of dead code within the random benchmark program 140 at random places to provide a good benchmark test for the tool.

Figure 2:
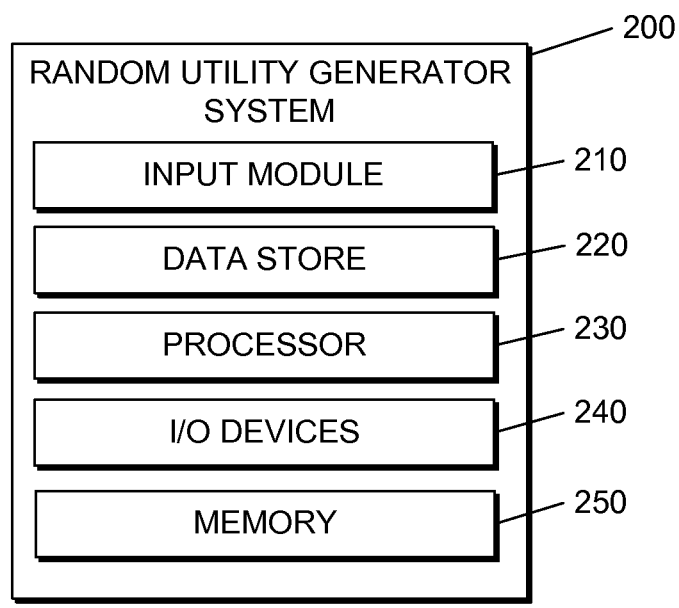

FIG. 2 illustrates an exemplary random utility generator system 200 for generating random benchmark programs. The system 200 includes an input module 210, a data store 220, one or more processors 230, one or more I/O (Input/Output) devices 240, and memory 250. The input module 220 may be used to input any type of information used in generating random benchmark programs. For example, the input module 210 may be used to receive configuration parameters, user-defined code elements, etc. In some implementations, data from the input module 210 is stored in the data store 220. The data included in the data store 220 may include, for example, configuration files, inject files, predefined code elements, random benchmark programs, and reachability matrices.

In some examples, the data store 220 may be a relational database that logically organizes data into a series of database tables. Each database table in the data store 220 may arrange data in a series of columns (where each column represents an attribute of the data stored in the database) and rows (where each row represents attribute values). In some implementations, the data store 220 may be an object-oriented database that logically or physically organizes data into a series of objects. Each object may be associated with a series of attribute values. In some examples, the data store 220 may be a type of database management system that is not necessarily a relational or object-oriented database. For example, a series of XML (Extensible Mark-up Language) files or documents may be used, where each XML file or document includes attributes and attribute values. Data included in the data store 220 may be identified by a unique identifier such that data related to a particular process may be retrieved from the data store 220.

The processor 230 may be a processor suitable for the execution of a computer program such as a general or special purpose microprocessor, and any one or more processors of any kind of digital computer. In some implementations, the system 200 includes more than one processor 230. The processor 230 may receive instructions and data from the memory 250. The memory 250 may store instructions and data corresponding to any or all of the components of the system 200. The memory 250 may include read-only memory, random-access memory, or both.

The I/O devices 240 are configured to provide input to and output from the system 200. For example, the I/O devices 240 may include a mouse, a keyboard, a stylus, or any other device that allows the input of data. The I/O devices 240 may also include a display, a printer, or any other device that outputs data.

Figure 3:
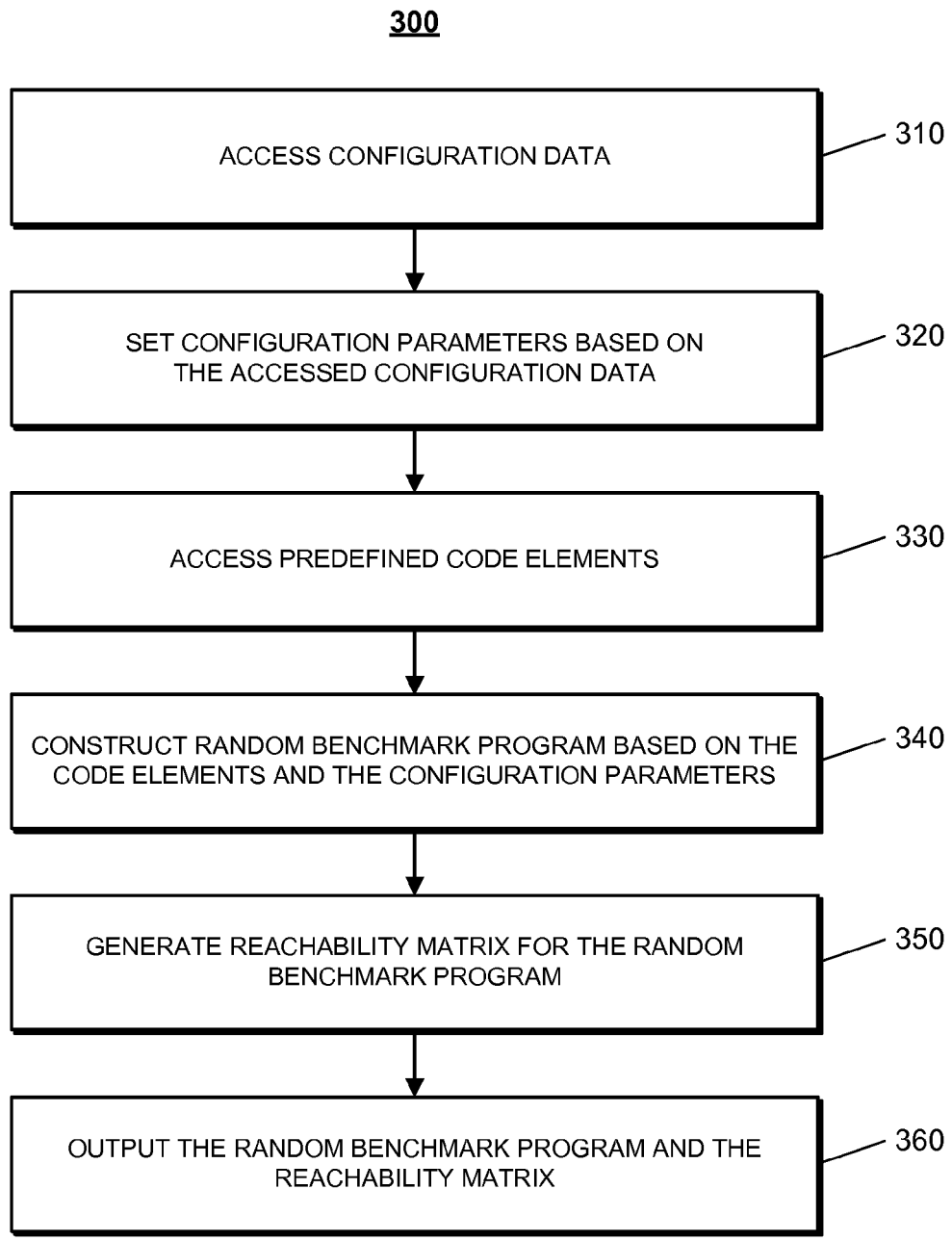
FIGS. 3, 6, 7, and 10 are flowcharts of exemplary processes.

FIG. 3 illustrates a process 300 for generating random benchmark programs. The operations of the process 300 are described generally as being performed by the system 200. In some implementations, operations of the process 300 may be performed by one or more processors included in one or more electronic devices.

The system 200 accesses configuration data (310). For instance, the system 300 accesses any type of configuration data that defines complexity and scale of a random benchmark program to generate. The system 200 also may access any other types of configuration data that may be useful in constructing a random benchmark program. The system 200 may access the configuration data directly from user input or may access the configuration data from electronic storage.

FIG. 4 illustrates an exemplary configuration file 400. The configuration file 400 may include configuration data defining parameters used by the system 200 in constructing random benchmark programs. The configuration file 400 may be accessed by the system 200 as described above with reference to numeral 310. The configuration file 400 may define scale and complexity parameters for random benchmark programs to generate. The configuration file 400 also may define any other types of parameters (e.g., database access information and credentials, etc.) that may be useful in constructing a random benchmark program.

As shown, the configuration file 400 defines multiple parameters used in generating a random benchmark program. For example, the configuration file 400 defines a number of interfaces parameter (i.e., noOfInterfaces). The number of interfaces parameter defines a maximum number of interfaces to be generated in the random benchmark program. The configuration file 400 also defines a use queries parameter (i.e., useQueries). The use queries parameter is a boolean value that sets whether queries (e.g., database queries) are to be used in the random benchmark program. The configuration file 400 further defines a maximum number of methods per interface parameter (i.e., maxNoOfMethodsPerinterface). The maximum number of methods per interface parameter defines a maximum number of allowed methods in an interface in the random benchmark program.

In addition, the configuration file 400 defines a number of classes parameter (i.e., noOfClasses). The number of classes parameter defines a number of classes to be generated in the random benchmark program. The configuration file 400 defines a maximum number of allowed method calls parameter (i.e., maxAllowedMethodCalls). The maximum number of allowed method calls parameter defines a maximum number of allowed method calls in a given method scope in the random benchmark program. The configuration file 400 defines an inject file parameter (i.e., injectFilename), which defines a name of a file that includes content (e.g., user-defined program code) to be injected in the random benchmark program.

Further, the configuration file 400 defines a database name parameter (i.e., dbName) that identifies a name of the database to be accessed in the random benchmark program. The configuration file 400 also defines a password parameter (i.e., password). The password parameter provides a password of the database (e.g., the database identified by the database name parameter) accessed in the random benchmark program.

The configuration file 400 defines a maximum array size parameter (i.e., maximumArraySize). The maximum array size parameter defines a maximum size of the generated arrays in the random benchmark program. The configuration file 400 also defines a number of inheritance chains parameter (i.e., noOfInheritanceChains). The number of inheritance chains parameter defines a number of inheritance chains among classes in the random benchmark program. The configuration file 400 further defines a probability parameter (i.e., probability). The probability parameter defines a probability value to determine nesting of statements in the random benchmark program.

In addition, the configuration file 400 defines a maximum nested conditional statements parameter (i.e., maxNestedIfs). The maximum nested conditional statements parameter defines a maximum nested depth of conditional (e.g., 'if') statements in the random benchmark program. The configuration file 400 defines a maximum inheritance depth parameter (i.e., maxInheritanceDepth). The maximum inheritance depth parameter defines a maximum depth of inheritance in an inheritance chain in the random benchmark program. The configuration file 400 defines a maximum number of parameters per method parameter (i.e., maxNoOfParametersPerMethod). The maximum number of parameters per method parameter defines a maximum number of parameters allowed for methods included in the random benchmark program.

The configuration file 400 defines a database driver parameter (i.e., dbDriver). The database driver parameter defines a name of a database driver to be used by the generated random benchmark program. The configuration file 400 also defines a total lines of code parameter (i.e., totalLOC). The total lines of code parameter defines a total number of lines of code to be generated in the random benchmark program. The configuration file 400 further defines a maximum recursion depth parameter (i.e., maxRecursionDepth). The maximum recursion depth parameter defines a maximum allowed (direct/indirect) recursion depth in the random benchmark program.

The configuration file 400 defines a database user name parameter (i.e., dbUsername). The database user name parameter defines a database user name used by the random benchmark program. The configuration file 400 also defines a class name prefix parameter (i.e., classNamePrefix). The class name prefix parameter defines a name to be prefixed with each of the generated class names in the random benchmark program. The configuration file 400 further defines a maximum number of class fields parameter (i.e., maxNoOfClassFields). The maximum number of class fields parameter defines a maximum number of class members allowed per class in the random benchmark program.

In addition, the configuration file 400 defines a maximum number of methods per class parameter (i.e., maxNoOfMethodsPerClass). The maximum number of methods per class parameter defines a maximum number of methods allowed per class in the random benchmark program. The configuration file 400 defines a recursion probability parameter (i.e., recursionProbability). The recursion probability parameter defines a probability used to determine recursive calls invocation in generating the random benchmark program. The configuration file 400 defines an integer maximum value parameter (i.e., intMaxValue). The integer maximum value parameter defines a maximum value for integer literals in the random benchmark program.

Further, the configuration file 400 defines a query file name parameter (i.e., queryFileName). The query file name parameter identifies a name of a file that includes one or more database queries that may be used in the random benchmark program. The configuration file 400 defines a call type parameter (i.e., callType). The call type parameter sets whether or not cross-class method calls can be made in the random benchmark program. The configuration file 400 defines an allowed types parameter (i.e., allowedTypes). The allowed types parameter defines primitive types allowed in the random benchmark program.

Referring again to FIG. 3, the system 200 sets configuration parameters based on the accessed configuration data (320). For instance, the system 200 may set, based on the accessed configuration data, configuration parameters that define properties for a random benchmark program to be constructed. The configuration parameters may relate to scale and complexity of the random benchmark program to be constructed. The system 200 may set configuration parameters based on parameters explicitly set within the accessed configuration data or may set configuration parameters based on abstract data describing desired scale and complexity of the random benchmark program to be constructed. The system 200 may set configuration parameters for each random benchmark program constructed or may set configuration parameters that are applied to multiple random benchmark programs that are constructed. The system 200 may set configuration parameters for any of the configuration parameters included in the configuration file 400 discussed above with respect to FIG. 4.

The system 200 accesses predefined code elements (330). For instance, the system 200 accesses code elements from a library that stores code elements corresponding to one or more grammars (e.g., programming languages). The code elements may include predefined parts of a benchmark program that include syntactically correct program statements that may be inserted into a random benchmark program.

For example, the code elements may include predefined segments of code that perform various operations defined by a programming language. In this example, the system 200 may access a first segment of code for setting up interfaces, a second segment of code for setting up classes, and a third segment of code for setting up methods. The segments of code may define a framework for performing an operation. The framework may be randomized when actually inserting the segments into a random benchmark application. The framework may include the required pieces of syntactically correct code and allow for naming conventions, variables, and relationships among different segments to be generated in a random manner based on the framework.

The system 200 also may access segments of code that perform operations in a body of a program (e.g., segments of code that perform operations in a method body). For instance, the system 200 may access a segment of code that defines a conditional statement (e.g., an if/else statement) that may be inserted into a program. The system 200 further may access a segment of code that defines a loop (e.g., while loop) that may be inserted into a program. The system 200 may access a segment of code that defines a recursive function that may be inserted into a program. The accessed segments of code may define a framework for the corresponding operations and may be randomized when actually inserting the segments into a random benchmark application. The framework may include the required pieces of syntactically correct code and allow for variables, order, and relationship among different segments to be generated in a random manner based on the framework.

In some implementations, the system 200 may access segments of code that are user-defined. In these implementations, the system 200 may receive user input defining a segment of code and may store the user-defined segment of code in the library of reusable code elements. The system 200 enables the user-defined segment of code to be included in random programs being generated and, therefore, enables users to use any types of code segments desired in generating random benchmark programs.

FIG. 5 illustrates an exemplary inject file 500. The inject file 500 may include user-defined code elements used by the system 200 in constructing random benchmark programs. The inject file 500 may be accessed by the system 200 as described above with reference to numeral 330. The inject file 500 may include any type of syntactically correct code a user wishes to insert into a random benchmark program being constructed by the system 200.

As shown in FIG. 5, the inject file 500 does not specify field names because field names are reserved for random generation by the system 200. The inject file 500 does not specify method names, including interface methods, because method names are reserved for random generation by the system 200. The inject file 500 does not include a class block because the system 200 writes the class block automatically and injects the content of the inject file 500 into the class block written by the system 200. The inject file 500 should be written to keep the types used consistent with the types defined in the configuration data (e.g., the configuration file 400) and void is not a valid type. Also, the inject file 500 should include methods that take at least one argument.

Referring again to FIG. 3, the system 200 constructs a random benchmark program based on the accessed code elements and the set configuration parameters (340). For example, the system 200 constructs a random benchmark program by injecting the accessed code elements into the random benchmark program in a random manner in accordance with the set configuration parameters. In this example, the system 200 uses randomization techniques to define variables and relationships among the accessed code elements in constructing the random benchmark program such that the constructed program exhibits random properties that are not biased by programming influences other than the set configuration parameters. The system 200 may achieve randomness by using a random graph model to generate a random benchmark program with predefined properties in accordance with the set configuration parameters. For instance, the system 200 may use a stochastic parse tree to generate code for the random benchmark program based on the accessed code elements.

The system 200 also considers the set configuration parameters in constructing the random benchmark program. For example, the set configuration parameters may include set values for parts of the random benchmark program and the system 200 constructs the random benchmark program to have the set values for parts of the random benchmark program. In this example, the configuration parameters may set the number of interfaces, the number of classes, the number of inheritance chains, and the total lines of code and the system 200 may construct a random benchmark program that has the set number of interfaces, the set number of classes, the set number of inheritance chains, and the set total lines of code.

In some examples, the set configuration parameters may define maximum values for parts of the random benchmark program. In these examples, the system 200 randomly constructs the parts of the random benchmark program, but does not allow the set maximum values to be exceeded (e.g., the values may be less than or equal to the maximum values). The configuration parameters may set the maximum number of methods per interface, the maximum number of allowed method calls, the maximum array size, the maximum number of nested conditional statements, the maximum inheritance depth, the maximum number of parameters per method, the maximum recursion depth, the maximum number of class fields, the maximum number of methods per class, and the maximum integer value. The system 200 may construct a random benchmark program that has a random number of methods per interface less than or equal to the set maximum number of methods per interface, that has a random number of method calls less than or equal to the set maximum number of allowed method calls, that has a random array size less than or equal to the set maximum array size, that has a random number of nested conditional statements less than or equal to the set maximum number of nested conditional statements, that has a random inheritance depth less than or equal to the set maximum inheritance depth, that has a random number of parameters per method less than or equal to the set maximum number of parameters per method, that has a random recursion depth less than or equal to the set maximum recursion depth, that has a random number of class fields less than or equal to the set maximum number of class fields, that has a random number of methods per class less than or equal to the set maximum number of methods per class, and that has random integer values less than or equal to the set maximum integer value.

The set configuration parameters also may define whether database queries are to be used in the random benchmark program. When the configuration parameters indicate that database queries are not to be used in the random benchmark program, the system 200 constructs the random benchmark program without using database queries. When the configuration parameters indicate that database queries are to be used in the random benchmark program, the system 200 constructs the random benchmark program with database queries in accordance with other configuration parameters that define how database queries should be performed, such as parameters that define a database name, a database driver to use, a username to use, a password to use, and a query file that includes information used to define one or more queries to perform.

The set configuration parameters further may define probabilities with which certain types of program elements should appear in the random benchmark program. For instance, a probability parameter may define a probability value to determine nesting of statements in the random benchmark program. The system 200 may reference the probability parameter and nest statements in the random benchmark program in accordance with the probability parameter. A recursion probability parameter may define a probability that recursive calls are invoked in the random benchmark program. The system 200 may reference the recursion probability parameter and invoke recursive calls in the random benchmark program in accordance with the recursion probability parameter.

In some implementations, the system 200 uses variables as opposed to literals in constructing code within the random benchmark program. For instance, the system 200 may construct conditional statements with variables as opposed to literals, which reduces dead code present in the random benchmark program. The variables are used in computations or randomly set prior to the conditional statements, which makes reaching each branch of the conditional statements possible depending on how the randomly set variables are set during program execution.

Figure 6:
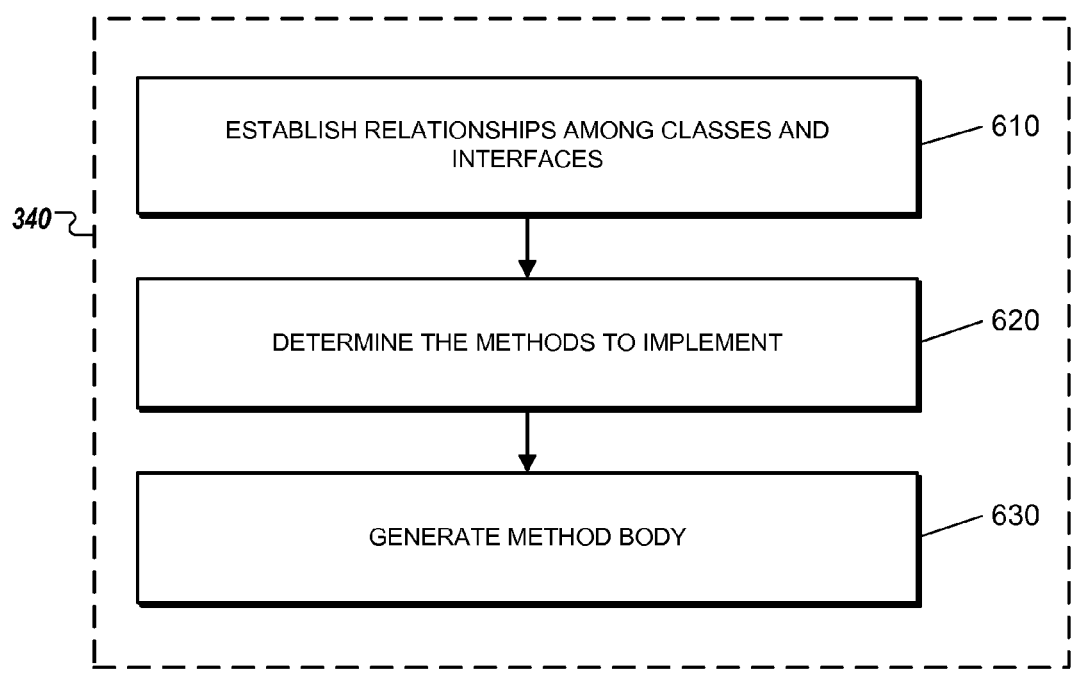

FIG. 6 illustrates a process 600 for constructing a random benchmark program. The process 600 may be used in constructing a random benchmark program referenced above with respect to reference numeral 340. The operations of the process 600 are described generally as being performed by the system 200. In some implementations, operations of the process 600 may be performed by one or more processors included in one or more electronic devices.

The system 200 establishes relationships among classes and interfaces (610). For instance, the system 200 instantiates a class generator object and an interface generator object. The system 200 randomly choses the instantiated class generator and interface generator objects to be part of inheritance chains. The system 200 determines the relationships between the various classes and interfaces before actual generation of the application code itself.

The system 200 determines methods to implement (620). For each of the classes, the system 200 determines methods to implement within the class based on randomization. For example, the system 200 includes a class generator that picks methods of super classes to override and overrides all methods of the interfaces it implements. The class generator then implements methods of its own all within allowed configured limits defined by the set configuration parameters. At this point, the system 200 only has generated the method signatures, which are persisted in the class generator object. The code generation for each of these methods is deferred to a later phase.

The system 200 generates the method bodies (630). After determining methods to implement, the system 200 generates code for each of the methods. For instance, the system 200 may generate a method body by growing a stochastic parse tree. The system 200 may grow the stochastic parse tree by flipping a coin every time the system 200 gets to a node to be grown and selecting one among a number of allowed productions at that node based on results of flipping a coin. The system 200 may include the following statements in the method body: if-else, for-loop, switch, print, method calls or database calls. The system 200 determines the nestedness of the statements and the expressions in the statements based on the probability parameter specified in the configuration data (e.g., the configuration file 400).

Figure 7:
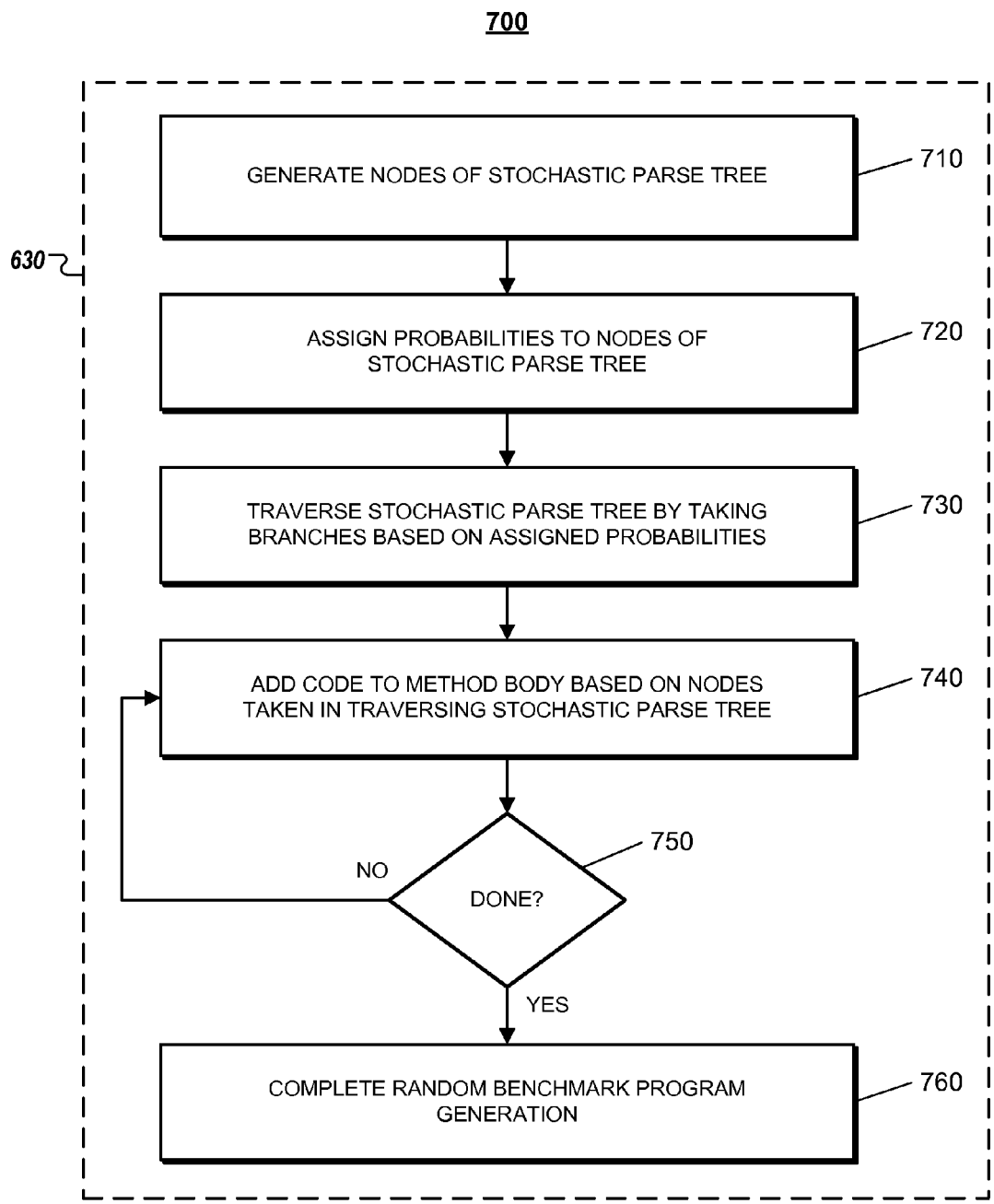

FIG. 7 illustrates a process 700 for generating a method body. The process 700 may be used in generating the method bodies referenced above with respect to reference numeral 630. The operations of the process 700 are described generally as being performed by the system 200. In some implementations, operations of the process 700 may be performed by one or more processors included in one or more electronic devices.

The system 200 generates nodes of a stochastic parse tree (710). For example, each time the system 200 reaches a node to be grown, the system 200 computes a random probabilistic operation (e.g., flipping a coin). In this example, the system 200 selects one among a number of allowed productions at the node to grow based on results of the random probabilistic operation. The system 200 associates the selected production with the node such that the production will be used by the system 200 when that node is reached when generating the random benchmark program. In some cases, the system 200 prevents the selected production from being associated with any other node in the stochastic parse tree. The system 200 continues to grow nodes of the stochastic parse tree until all nodes of the stochastic parse tree have been grown (e.g., all productions have been associated with a node of the stochastic parse tree or a predetermined number nodes of the stochastic parse tree have been grown).

Figure 8:
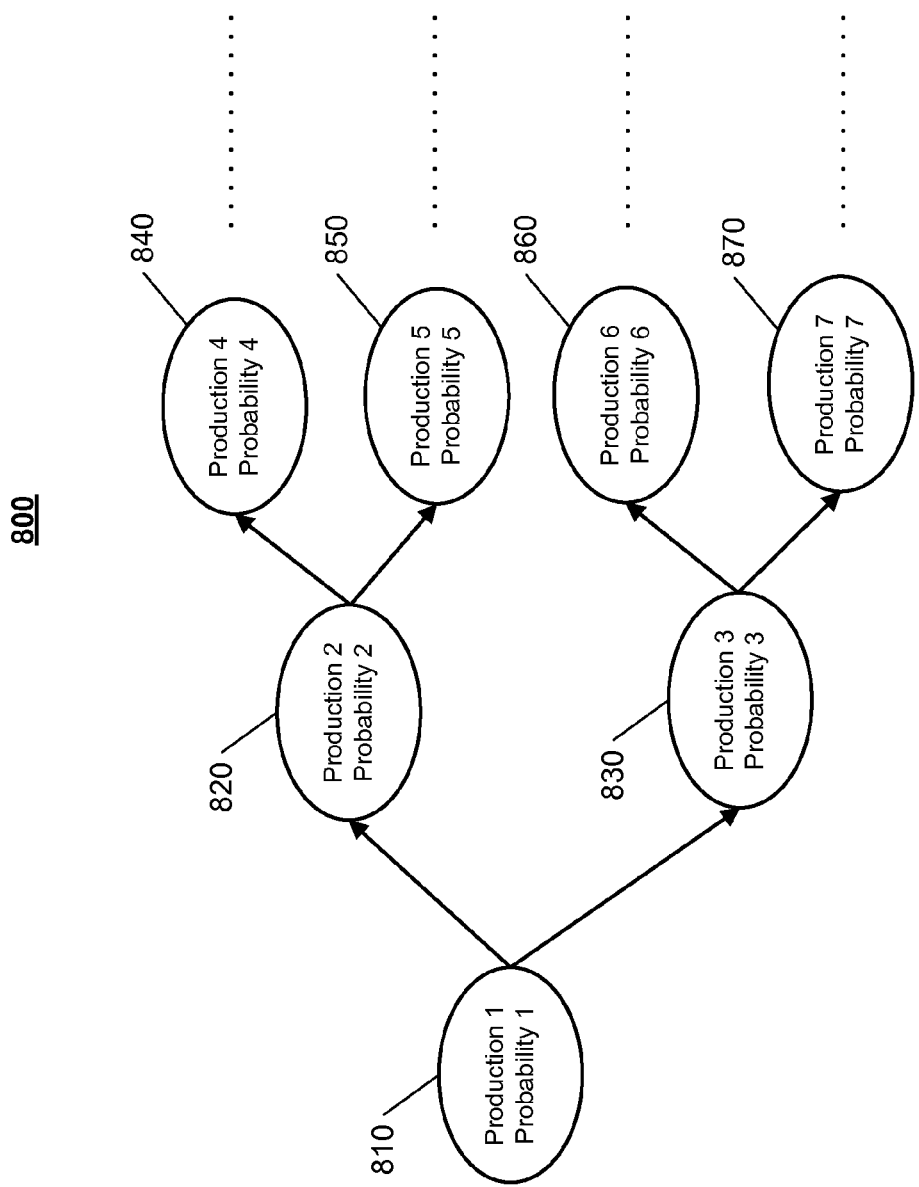
FIG. 8 illustrates an exemplary stochastic parse tree.

FIG. 8 illustrates an exemplary stochastic parse tree 800. As shown, the stochastic parse tree 800 has nodes 810, 820, 830, 840, 850, 860, and 870. The system 200 has associated a unique production with each of the nodes 810, 820, 830, 840, 850, 860, and 870. Each production was selected from among a set of allowed productions and defines a framework for syntactically correct program code that may be added to the random benchmark program when the corresponding node is reached when traversing the stochastic parse tree 800. Although seven nodes are shown in the stochastic parse tree 800 for brevity, more (perhaps many more) or fewer nodes may be used in the stochastic parse tree 800. In addition, more complex branching with the stochastic parse tree 800 may be used.

Referring again to FIG. 3, the system 200 assigns probabilities to nodes of the stochastic parse tree (720). For example, the system 200 may assign probability values to each node in the stochastic parse tree. In this example, the probability values influence which branch will be taken from the corresponding node in the stochastic parse tree. For instance, a sixty percent probability may be assigned to a node to give the node a sixty percent probability of taking a first branch from the node in the stochastic parse tree and a forty percent probability of taking a second branch from the node in the stochastic parse tree.

In some implementations, the system 200 may assign probability distribution functions to each node in the stochastic parse tree. In these implementations, the system 200 also may assign bounds to the probability distribution functions assigned to each node in the stochastic parse tree. The assigned probability distribution functions and bounds may be used in determining which branch is taken from the corresponding node in the stochastic parse tree.

In the example shown in FIG. 8, the stochastic parse tree 800 has a unique probability (e.g., probability distribution function with bounds) assigned to each of the nodes 810, 820, 830, 840, 850, 860, and 870. The system 200 assigned each probability based on configuration parameters set for constructing a random benchmark program. The assigned probabilities influence how the stochastic parse tree 800 is traversed by influencing which branch is taken at each of the nodes 810, 820, 830, 840, 850, 860, and 870.

The system 200 traverses the stochastic parse tree by taking branches based on assigned probabilities (730). For example, the system 200 starts at a highest level node in the stochastic parse tree and evaluates the probability (e.g., probability distribution function) assigned to the highest level node. In this example, the system 200 determines which branch to take from the highest level node based on the evaluation of the probability assigned to the highest level node. Depending on which branch the system 200 determines to take from the highest level node, the system 200 arrives at a lower level node in the stochastic parse tree. The system 200 evaluates the probability (e.g., probability distribution function) assigned to the lower level node and determines which branch to take from the lower level node based on the evaluation of the probability assigned to the highest level node. Depending on which branch the system 200 determines to take from the lower level node, the system 200 arrives at an even lower level node in the stochastic parse tree. The system 200 continues this process until the system 200 reaches a terminal node in the stochastic parse tree. The system 200 may repeat traversing of the stochastic parse tree depending on whether additional code is needed in the random benchmark program when the system 200 reaches the terminal node. Because the path taken in traversing the stochastic parse tree is based on the probability (e.g., probability distribution function) assigned to nodes in the stochastic parse tree, the path is essentially random, but potentially weighted toward particular nodes depending on the probabilities assigned.

In the example shown in FIG. 8, the system 200 starts at node 810 and evaluates the first probability assigned to node 810. Based on results of evaluating the first probability assigned to node 810, the system 200 moves to node 820 or node 830. Because node 820 and node 830 are not terminal nodes, the system 200 continues to evaluate probabilities assigned to nodes and continues to traverse the stochastic parse tree 800.

When the system 200 moves to node 820, the system 200 evaluates the second probability assigned to node 820. Based on results of evaluating the second probability assigned to node 820, the system 200 moves to node 840 or node 850. Because node 840 and node 850 are shown as terminal nodes, the system 200 stops traversing the stochastic parse tree 800 at node 840 or node 850. If node 840 and node 850 were not terminal nodes, the system 200 would continue to evaluate probabilities assigned to nodes and continue to traverse the stochastic parse tree 800. Traversal of the stochastic parse tree 800 may be repeated by returning to node 810 and repeating the evaluation of the first probability.

When the system 200 moves to node 830, the system 200 evaluates the third probability assigned to node 830. Based on results of evaluating the third probability assigned to node 830, the system 200 moves to node 860 or node 870. Because node 860 and node 870 are shown as terminal nodes, the system 200 stops traversing the stochastic parse tree 800 at node 860 or node 870. If node 860 and node 870 were not terminal nodes, the system 200 would continue to evaluate probabilities assigned to nodes and continue to traverse the stochastic parse tree 800. Traversal of the stochastic parse tree 800 may be repeated by returning to node 810 and repeating the evaluation of the first probability.

The system 200 adds code to a method body based on nodes taken in traversing the stochastic parse tree (740). For instance, at each node taken in traversing the stochastic parse tree, the system 200 evaluates a production rule associated with the node and adds code to a method body based on evaluation of the production rule. The production rule may define a code element to add to the method body when the node is reached in traversing the stochastic parse tree. The code element may be a conditional statement code segment, a recursive function code segment, a loop code segment, or any other type of code segment that may be added to a random benchmark program. The system 200 may randomly determine variables and other parameters of the code element when adding the code element to the method body. The system 200 continues to add different code elements to the method body as the system 200 traverses the stochastic parse tree and reaches different nodes. When the system 200 reaches a terminal node, the system 200 may determine whether additional code is needed in the method body and return to the highest level node in the stochastic parse tree to repeat traversal of the stochastic parse tree.

In the example shown in FIG. 8, the system 200 starts at node 810 and adds code to a method body based on the first production associated with node 810. After adding code to the method body based on the first production, the system 200 moves to node 820 or node 830.

When the system 200 moves to node 820, the system 200 adds code to the method body based on the second production associated with node 820. The code added based on the second production follows the code added based on the first production in the method body. After adding code to the method body based on the second production, the system 200 moves to node 840 or node 850. When the system 200 moves to node 840, the system 200 adds code to the method body based on the fourth production associated with node 840 and, when the system 200 moves to node 850, the system 200 adds code to the method body based on the fifth production associated with node 850. The code added based on the fourth or fifth production follows the code added based on the second production in the method body.

When the system 200 moves to node 830, the system 200 adds code to the method body based on the third production associated with node 830. The code added based on the third production follows the code added based on the first production in the method body. After adding code to the method body based on the third production, the system 200 moves to node 860 or node 870. When the system 200 moves to node 860, the system 200 adds code to the method body based on the sixth production associated with node 860 and, when the system 200 moves to node 870, the system 200 adds code to the method body based on the seventh production associated with node 870. The code added based on the six or seventh production follows the code added based on the third production in the method body.

The system 200 determines whether generation of method bodies is complete (750). For example, the system 200 determines whether code has been added to all of the method bodies. In this example, the system 200 determines that generation of method bodies is complete based on a determination that code has been added to all of the method bodies. The system 200 determines that generation of method bodies is incomplete based on a determination that code has not been added to all of the method bodies and continues to add code to method bodies that are not complete by repeatedly traversing the stochastic parse tree until code has been added to all method bodies.

In some implementations, the system 200 determines whether configuration parameters set for construction of the random benchmark program are met when code has been added to all of the method bodies. In these implementations, the system 200 checks whether the code added to the method bodies meets the complexity and scale of the desired benchmark program defined by the configuration parameters. When the system 200 determines that the complexity and scale of the desired benchmark program defined by the configuration parameters has not been met, the system 200 adds additional code to method bodies by repeatedly traversing the stochastic parse tree until the complexity and scale of the desired benchmark program defined by the configuration parameters has been met.

For instance, the system 200 may check whether the total lines of code parameter has been met after code has been added to all of the method bodies. Based on a determination that the total lines of code parameter has not been met, the system 200 adds additional code to method bodies by repeatedly traversing the stochastic parse tree until the total lines of code parameter has been met.

Based on a determination that generation of method bodies is complete, the system 200 completes random benchmark program generation (760). For instance, the system 200 finalizes the random benchmark program and stores the random benchmark program in its final form. The system 200 also may perform validation on the random benchmark program to confirm that the random benchmark program was constructed correctly and in accordance with set configuration parameters. The system 200 further may compile the random benchmark program to place the random benchmark program in a form that may be executed on a system to be tested.

Referring again to FIG. 3, the system 200 generates a reachability matrix for the random benchmark program (350). The system 200 may generate a reachability matrix as a comma separated values file (.csv file). The reachability matrix shows reachability of code within the random benchmark program. For instance, the reachability matrix may show the methods reachable from any given method in the generated application. The reachability matrix may help the user of the constructed random benchmark program to write effective invocation stubs to ensure good code coverage. The system 200 may generate the reachability matrix during construction of the random benchmark program by populating the reachability matrix as methods are added to the random benchmark program during construction. The system 200 also may generate the reachability matrix after construction of the random benchmark program by analyzing reachability of methods within the constructed random benchmark program and populating the reachability matrix based on the analysis.

FIG. 9 illustrates an exemplary reachability matrix 900. The reachability matrix 900 includes rows 910 of method names and columns 920 of method names. In this example, all of the methods in the random benchmark program are included in the rows 910 and the columns 920. For each method, the reachability matrix 900 shows which other methods in the random benchmark program are reachable from the method. As shown, the reachability matrix 900 includes a zero value to indicate that a method is not reachable from another method and a one value to indicate that a method is reachable from another method. Although six methods are shown in the reachability matrix 900 for brevity, more (perhaps many more) or fewer methods may be used in the reachability matrix 900.

Referring again to FIG. 3, the system 200 outputs the random benchmark program and the reachability matrix (360). For instance, the system 300 displays the random benchmark program and the reachability matrix, stores the random benchmark program and the reachability matrix in electronic storage, sends the random benchmark program and the reachability matrix in an electronic communication (e.g., an electronic mail message), prints a copy of the random benchmark program and the reachability matrix using a printing device, or performs any other output operation that enables a user to perceive the random benchmark program and the reachability matrix and use the random benchmark program and the reachability matrix in a later benchmark testing process.

Figure 10:
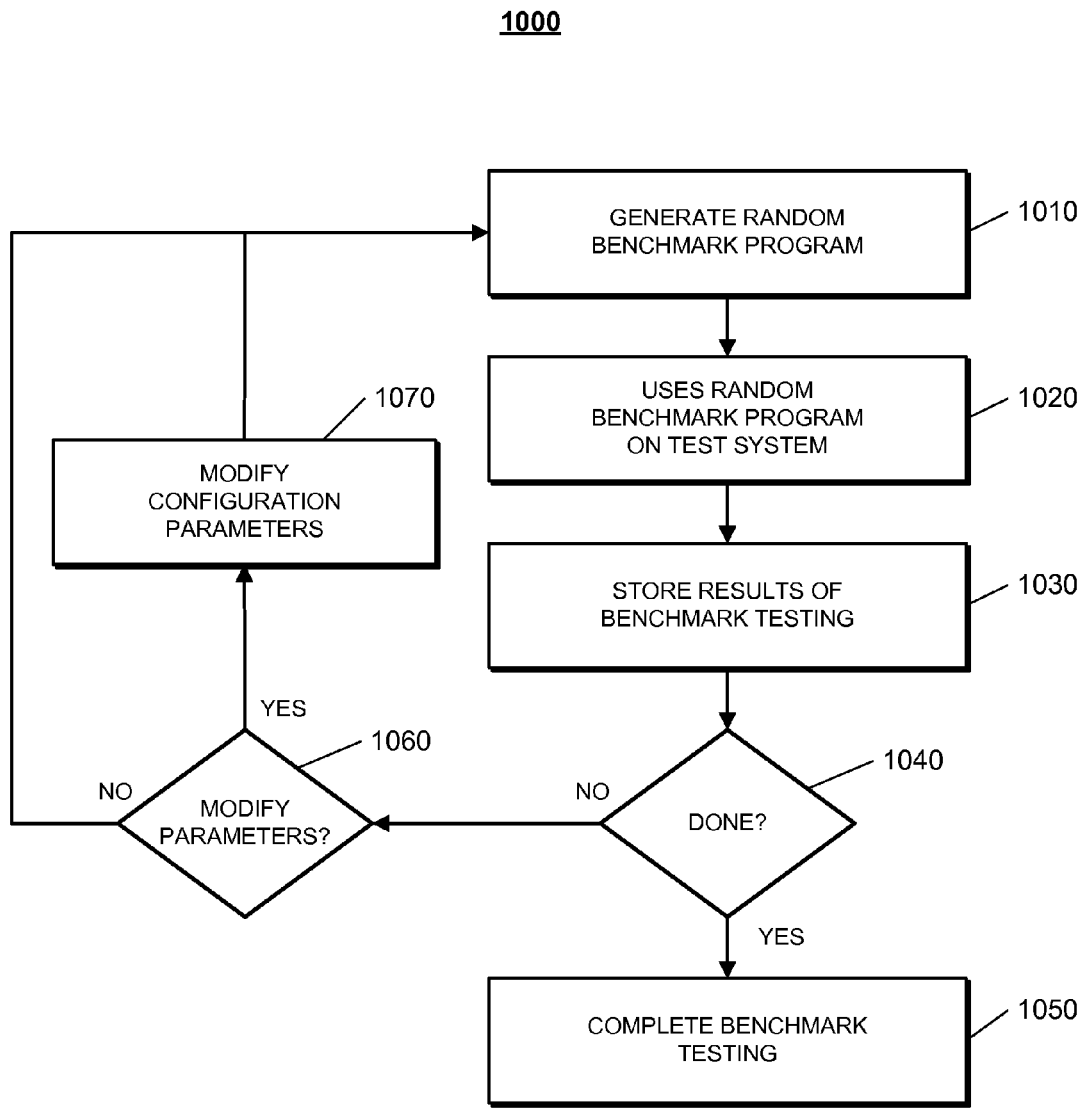

FIG. 10 illustrates a flowchart of an exemplary process 1000 for benchmark testing. The operations of the process 1000 are described generally as being performed by the system 200. In some implementations, operations of the process 1000 may be performed by one or more processors included in one or more electronic devices.

The system 200 generates a random benchmark program (1010). For instance, the system 200 generates a random benchmark program using any of the techniques described throughout this disclosure. The system 200 may construct a random benchmark program in accordance with the processes 300, 600, and 700 described above with respect to FIGS. 3, 6, and 7, respectively.

The system 200 uses the generated random benchmark program on a test system (1020). For instance, the system 200 executes the generated random benchmark program on a test system to perform a benchmark test for hardware and/or software of the test system. The system 200 may monitor results of the benchmark test, including speed of execution, accuracy of results, memory used, or any other statistic that relates to how well the test system performed in executing the generated random benchmark program. The system 200 may use the generated random benchmark program to perform benchmark testing on compilers, virtual machines, processors, memory systems, testing tools, or any other type of system, tool, or software program that allows benchmark testing.

In some implementations, the system 200 uses the generated random benchmark program to test a program analysis tool. In these implementations, the system 200 may provide the generated random benchmark program to a program analysis tool and control the program analysis tool to analyze the generated random benchmark program. Because the system 200 has information of how the random benchmark program was generated (e.g., a reachability matrix), the system 200 may compare results of the analysis performed by the program analysis tool with known attributes of the generated random benchmark program and, based on the comparison, determine whether the program analysis tool did a good job in analyzing the generated random benchmark program.

In some examples, the system 200 may intentionally introduce problems (e.g., dead code) in the generated random benchmark program and track where the problems were introduced. In these examples, the system 200 may determine whether a program analysis tool was able to detect all of the problems introduced into the generated random benchmark program based on tracked data describing where the problems were introduced. In this regard, the system 200 is able to effectively test the program analysis tool with random programs.

The system 200 stores results of benchmark testing (1030). For instance, the system 200 stores results of benchmark testing in electronic storage for later retrieval, display, and incorporation into a benchmark report for the test system. The results of benchmark testing may include statistics related to performance of the test system in executing the generated random benchmark program and/or statistics related to how well a program analysis tool did in analyzing the generated random benchmark program.

The system 200 determines whether benchmark testing is complete (1040). For example, the system 200 determines whether all of the benchmark testing operations have been performed on the test system. In this example, the system 200 may be tasked with automatically performing a predetermined number of benchmark tests on the test system. Each benchmark test may be performed with a different randomly generated benchmark program and the system 200 determines that benchmark testing is complete when the predetermined number of benchmark tests have been performed on the test system.

Based on a determination that benchmark testing is complete, the system 200 completes benchmark testing (1050). For instance, the system 200 stops generating random benchmark programs and stops using the random benchmark programs to benchmark test the test system. The system 200 may organize all results of the benchmark testing in electronic storage and compute statistics related to the benchmark testing, such as average or median results of benchmark testing. The system 200 then may output the results of the benchmark testing using techniques similar to those described above with respect to reference numeral 360.

Based on a determination that benchmark testing is not complete, the system 200 determines whether modification of configuration parameters used to generate the random benchmark program is needed (1060). For example, the system 200 may access data setting up benchmark testing of the test system and determine whether the data setting up benchmark testing of the test system calls for a modification of configuration parameters in performing benchmark testing. In this example, the data setting up benchmark testing of the test system may define that a first predetermined number of benchmark tests should be performed on the test system using random benchmark programs generated in accordance with a first set of configuration parameters and that a second predetermined number of benchmark tests should be performed on the test system using random benchmark programs generated in accordance with a second set of configuration parameters. When the system 200 determines that the first predetermined number of benchmark tests have been performed on the test system using random benchmark programs generated in accordance with the first set of configuration parameters, the system 200 determines that modification of configuration parameters used to generate the random benchmark program is needed. The data setting up benchmark testing may define any number of benchmark tests for any combination of configuration parameters used to generate the random benchmark programs. In this regard, the system 200 may, in an automated manner, gather a wide range of benchmark testing data on the test system that covers programs of varying scale and complexity.

Based on a determination that modification of configuration parameters used to generate the random benchmark program is not needed, the system 200 returns to operation 1010 to generate a new random benchmark program without a change in configuration parameters. For instance, the system 200 generates another random benchmark program using the configuration parameters used to generate the previous random benchmark program. The system 200 then uses the new random benchmark program in benchmark testing the test system and stores results of the benchmark testing performed using the new random benchmark program. Generating a new random benchmark program without a change in configuration parameters and using the new random benchmark program in benchmark testing the test system may enable the system 200 to collect statistics related to performance of the test system for programs that have a scale and complexity defined by the unchanged configuration parameters. The system 200 may continue to generate new random benchmark programs based on the unchanged configuration parameters and use the new random benchmark programs in benchmark testing the test system until a sufficient amount of benchmark testing data has been collected to meet statistical confidence levels desired by the user.

Based on a determination that modification of configuration parameters used to generate the random benchmark program is needed, the system 200 modifies configuration parameters used to generate the random benchmark program (1070). For example, the system 200 may modify the configuration parameters based on data setting up benchmark testing of the test system. In this example, the system 200 may arrive at configuration parameters that specify a program of different scale and complexity. The system 200 may modify the total lines of code, the number of interfaces, the probability of recursive calls, or any other configuration parameter described throughout this disclosure.

After modifying the configuration parameters used to generate the random benchmark program, the system 200 generates a new random benchmark program using the modified configuration parameters. The system 200 then uses the new random benchmark program in benchmark testing the test system and stores results of the benchmark testing performed using the new random benchmark program.

Generating a new random benchmark program with modified configuration parameters and using the new random benchmark program in benchmark testing the test system may enable the system 200 to collect statistics related to performance of the test system for programs that have a different scale and complexity from other random benchmark programs used in benchmark testing. The system 200 may continue to generate new random benchmark programs based on the modified configuration parameters and use the new random benchmark programs in benchmark testing the test system until a sufficient amount of benchmark testing data has been collected to meet statistical confidence levels desired by the user. The system 200 may continue to modify the configuration parameters and collect benchmark testing data for random benchmark programs having a wide range of scale and complexity.

Figure 11:
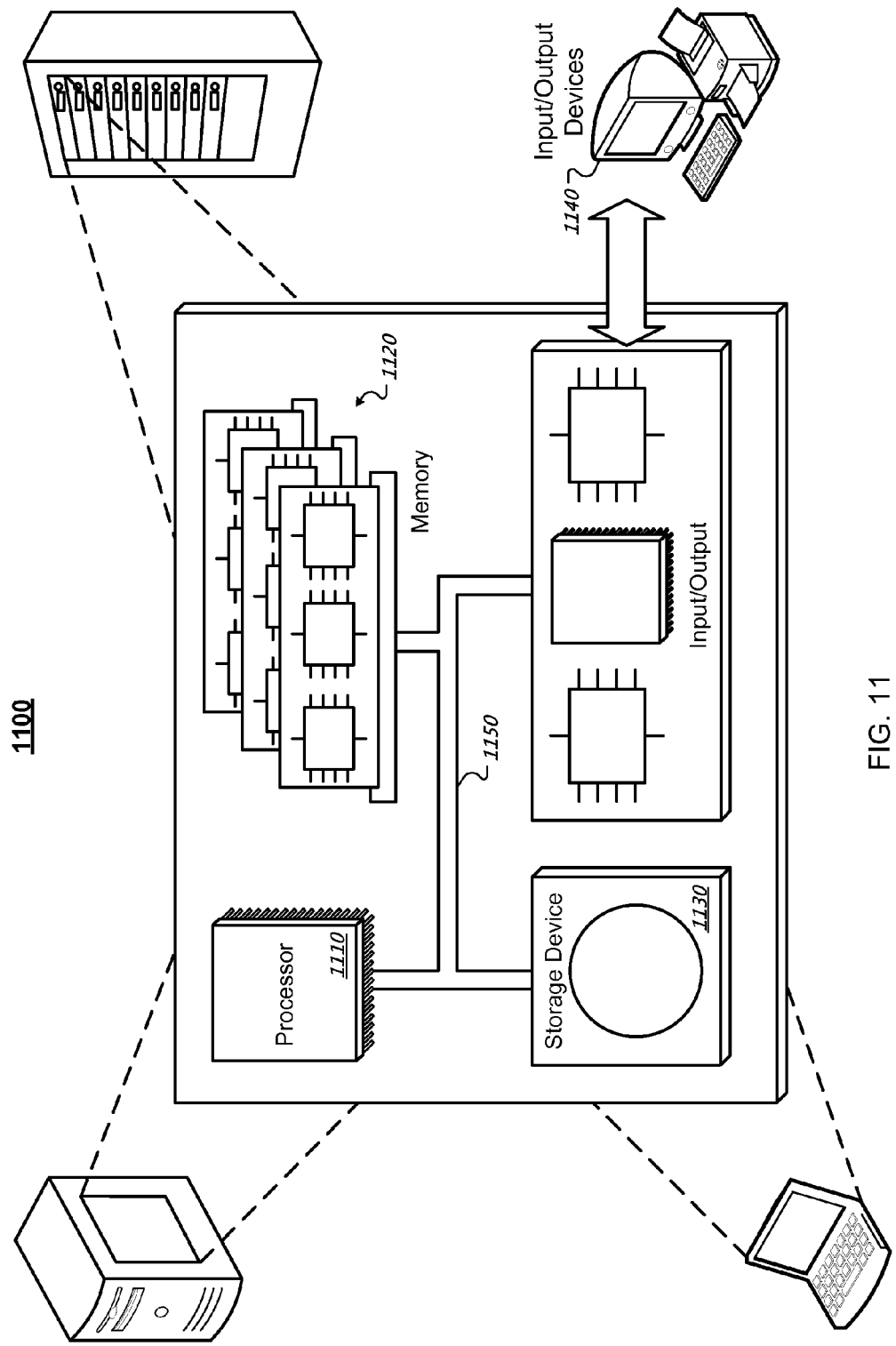

FIG. 11 is a schematic diagram of an example of a generic computer system 1100. The system 1100 can be used for the operations described in association with the processes 300, 600, 700, and 1000, according to some implementations. The system 1100 may be included in the systems 100 and 200.

The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A random utility generation system comprising:
   at least one processor; and
   at least one memory coupled to the at least one processor having stored thereon instructions which, when executed by the at least one processor, causes the at least one processor to perform operations comprising:

accessing configuration data that is descriptive of benchmark program complexity and scale;

setting configuration parameters used in generating random benchmark programs based on the accessed configuration data;

accessing predefined code elements that are used in generating random benchmark programs;

constructing a random benchmark program that has the benchmark program complexity and scale based on the accessed code elements and the set configuration parameters;

generating a reachability matrix for the random benchmark program that shows reachability of code within the random benchmark program; and outputting the random benchmark program.

2. The random utility generation system of claim 1, wherein constructing the random benchmark program comprises using a random graph model to generate a random benchmark program with predefined properties.

3. The random utility generation system of claim 1, wherein constructing the random benchmark program comprises using a stochastic parse tree to generate code for a random benchmark program based on the accessed code elements.

4. The random utility generation system of claim 1, wherein generating the reachability matrix for the random benchmark program comprises generating a reachability matrix for the random benchmark program that shows which methods are reachable from any given method in the random benchmark program.

5. The random utility generation system of claim 1, wherein accessing configuration data that is descriptive of benchmark program complexity and scale comprises accessing a configuration file that defines threshold numbers of parts of the random benchmark program to construct and probability that certain types of code elements are included in the random benchmark program.

6. The random utility generation system of claim 1:
   wherein accessing predefined code elements that are used in generating random benchmark programs comprises accessing an injection file that includes user-defined code elements that are syntactically correct; and
   wherein constructing the random benchmark program comprises injecting the user-defined code elements that are syntactically correct in classes generated for the random benchmark program.

7. The random utility generation system of claim 1, wherein constructing the random benchmark program comprises constructing conditional statements with variables as opposed to literals, thereby reducing dead code present in the random benchmark program.

8. The random utility generation system of claim 1, wherein constructing the random benchmark program comprises establishing relationships among classes and interfaces in the random benchmark program.

9. The random utility generation system of claim 8, wherein constructing the random benchmark program comprises determining methods to implement in the random benchmark program.

10. The random utility generation system of claim 9, wherein constructing the random benchmark program comprises generating bodies for the determined methods to implement in the random benchmark program.

11. The random utility generation system of claim 10, wherein generating bodies for the determined methods to implement in the random benchmark program comprises:
- generating nodes of a stochastic parse tree;
- assigning probabilities to the generated nodes of the stochastic parse tree;
- traversing the stochastic parse tree by taking branches of the stochastic parse tree based on the assigned probabilities; and
- adding code to a method body based on nodes taken in traversing the stochastic parse tree.

12. The random utility generation system of claim 11, wherein generating bodies for the determined methods to implement in the random benchmark program comprises:
- determining whether generation of bodies for the determined methods to implement in the random benchmark program is complete;
- based on a determination that generation of bodies for the determined methods to implement in the random benchmark program is not complete, continuing to add code to bodies for the determined methods to implement in the random benchmark program by traversing the stochastic parse tree; and
- based on a determination that generation of bodies for the determined methods to implement in the random benchmark program is complete, completing construction of the random benchmark program.

13. The random utility generation system of claim 11:
- wherein generating nodes of a stochastic parse tree comprises generating nodes of a stochastic parse tree that each are associated with a language grammar production rule;
- wherein assigning probabilities to the generated nodes of the stochastic parse tree comprises assigning probability distribution functions to the generated nodes of the stochastic parse tree that each are associated with a language grammar production rule;
- wherein traversing the stochastic parse tree by taking branches of the stochastic parse tree based on the assigned probabilities comprises traversing the stochastic parse tree by taking branches of the stochastic parse tree based on the assigned probability distribution functions; and
- wherein adding code to a method body based on nodes taken in traversing the stochastic parse tree comprises adding code to a method body based on language grammar production rules associated with nodes taken in traversing the stochastic parse tree.

14. The random utility generation system of claim 13, wherein assigning probability distribution functions to the generated nodes of the stochastic parse tree that each are associated with a language grammar production rule comprises placing bounds on the probability distribution functions assigned to the generated nodes of the stochastic parse tree that each are associated with a language grammar production rule.

15. The random utility generation system of claim 1, wherein the operations further comprise:
- running the random benchmark program on a test system; and
- storing results of benchmark testing of the test system based on running the random benchmark program on the test system.

16. The random utility generation system of claim 15, wherein the operations further comprise:
- determining whether benchmark testing of the test system is complete;
- based on a determination that benchmark testing of the test system is complete, completing benchmark testing of the test system; and
- based on a determination that benchmark testing of the test system is not complete, constructing a new random benchmark program and running the new random benchmark program on the test system,
- wherein storing results of benchmark testing of the test system comprises storing results of benchmark testing of the test system based on running the random benchmark program on the test system and running the new random benchmark program on the test system.

17. The random utility generation system of claim 16, wherein the operations further comprise:
- based on a determination that benchmark testing of the test system is not complete, determining whether modification of the set configuration parameters used to construct the random benchmark program is needed,
- wherein constructing the new random benchmark program comprises:
  - based on a determination that modification of the set configuration parameters used to construct the random benchmark program is not needed, constructing a new random benchmark program based on the accessed code elements and the set configuration parameters; and
  - based on a determination that modification of the set configuration parameters used to construct the random benchmark program is needed, modifying the set configuration parameters used to construct the random benchmark program and constructing a new random benchmark program based on the accessed code elements and the modified configuration parameters.

18. A method comprising:
- accessing configuration data that is descriptive of benchmark program complexity and scale;
- setting configuration parameters used in generating random benchmark programs based on the accessed configuration data;
- accessing, from electronic storage, predefined code elements that are used in generating random benchmark programs;
- constructing, by at least one processor, a random benchmark program that has the benchmark program complexity and scale based on the accessed code elements and the set configuration parameters;
- generating a reachability matrix for the random benchmark program that shows reachability of code within the random benchmark program; and
- outputting the random benchmark program.

19. At least one computer-readable storage medium encoded with executable instructions that, when executed by at least one processor, cause the at least one processor to perform operations comprising:
- accessing configuration data that is descriptive of benchmark program complexity and scale;
- setting configuration parameters used in generating random benchmark programs based on the accessed configuration data;
- accessing predefined code elements that are used in generating random benchmark programs;

constructing a random benchmark program that has the benchmark program complexity and scale based on the accessed code elements and the set configuration parameters;

generating a reachability matrix for the random benchmark program that shows reachability of code within the random benchmark program; and outputting the random benchmark program.

\* \* \* \* \*

UNITED STATES PATENT AND TRADEMARK OFFICE
CERTIFICATE OF CORRECTION

PATENT NO. : 8,423,986 B1
APPLICATION NO. : 13/271686
DATED : April 16, 2013
INVENTOR(S) : Mark Grechanik Page 1 of 1

It is certified that error appears in the above-identified patent and that said Letters Patent is hereby corrected as shown below:

Title Page 2, Item (56) References Cited, column 2, line 11, under "OTHER PUBLICATIONS", please delete "Merkel" and insert -- Meikel --, therefor.

Signed and Sealed this
Sixteenth Day of July, 2013

Teresa Stanek Rea
*Acting Director of the United States Patent and Trademark Office*